United States Patent [19]

Orth et al.

[11] Patent Number: 4,632,358
[45] Date of Patent: Dec. 30, 1986

[54] AUTOMOTIVE AIR CONDITIONING SYSTEM INCLUDING ELECTRICALLY OPERATED EXPANSION VALVE

[75] Inventors: Charles D. Orth, Lake Forrest; Robert J. Torrence, Addison, both of Ill.

[73] Assignee: Eaton Corporation, Cleveland, Ohio

[21] Appl. No.: 734,936

[22] Filed: May 16, 1985

Related U.S. Application Data

[63] Continuation-in-part of Ser. No. 631,663, Jul. 17, 1984, abandoned.

[51] Int. Cl.⁴ .............................................. F16K 31/02
[52] U.S. Cl. ................................. 251/117; 62/528; 251/129.07
[58] Field of Search ........................ 62/528, 222, 210; 251/117, 282, 129, 141

[56] References Cited

U.S. PATENT DOCUMENTS

| | | | |
|---|---|---|---|
| 3,810,488 | 5/1974 | Orth et al. | 62/217 X |
| 4,362,027 | 12/1982 | Barbier | 62/197 |
| 4,425,767 | 1/1984 | Barbier | 62/212 |
| 4,459,819 | 7/1984 | Hargraves | 62/212 |

*Primary Examiner*—William E. Wayner
*Attorney, Agent, or Firm*—C. H. Grace; R. A. Johnston

[57] ABSTRACT

An automotive air conditioning system including an electrically operated expansion valve controlling refrigerant flow to the evaporator. The valve is pressure balanced and provides a minimum flow even when the valve is fully closed. The valve includes a solenoid operator which is energized in a pulse width modulated fashion.

11 Claims, 5 Drawing Figures

AUTOMOTIVE AIR CONDITIONING SYSTEM INCLUDING ELECTRICALLY OPERATED EXPANSION VALVE

This is a continuation-in-part of the co-pending application Ser. No. 631,663, filed July 17, 1984, now abandoned.

BACKGROUND OF THE INVENTION

This invention relates to automotive air conditioning systems and, more particularly, to an electrically operated expansion valve for use in such a system.

Automotive air conditioning systems typically utilize either a thermostatic expansion valve or an orifice tube to control the flow of refrigerant to the evaporator. While such systems operate generally satisfactorily, the amount of control thereover is minimal. It is therefore a primary object of the present invention to provide an automotive air conditioning system subject to precise control of refrigerant feed to the evaporator.

Automotive control systems are becoming increasingly more sophisticated, with onboard microcomputers being provided for controlling such functions as engine speed, fuel flow, fuel mixture, transmission ratio, etc. It is therefore another object of this invention to provide a means whereby the onboard computer in an automobile may effect precise control over the air conditioning system.

Electrically operated expansion valves are known. However, in an automotive application, where the valve is required to open under a differential pressure of at least 300 p.s.i., the valve operator must be sufficient to open the valve under such differential pressure conditions without placing an undue load upon the automotive electrical system. It is therefore a further object of this invention to provide such an electrically operated valve.

SUMMARY OF THE INVENTION

The foregoing, and additional, objects are attained in accordance with the principles of this invention by providing an electrically operated expansion valve for use in an automotive air conditioning system comprising a valve body formed with an internal bore extending into the body from one end thereof, an inlet port generally transverse to and intersecting the bore, and an outlet port generally transverse to and intersecting the bore, the inlet and outlet ports being offset relative to each other along the major axis of the bore, with the inlet port being closer to one end of the valve than the outlet port; a hollow sleeve member tightly fitted within the bore in the region of the outlet port, the sleeve member being formed with a valve seat on one end thereof and an opening through its wall to provide communication between the interior of the sleeve member and the outlet port, the sleeve member being further formed with an exterior channel extending the length of the sleeve member substantially opposite the opening; a solenoid mounted on the one end of the valve body, the solenoid having a movable plunger extending into the internal bore, the end of the plunger which extends into the internal bore being formed as a valve member to cooperate with the valve seat to control the flow through the inlet and outlet ports, energization of the solenoid causing the plunger to move outward from the valve body; spring means for yieldably biasing the plunger inward of the valve body; means for pressure balancing the valve; and means for providing at least a minimum flow through the inlet and outlet ports independent of the condition of the solenoid.

In an automotive air conditioning system of the type having a compressor driven by the engine, the compressor operating to deliver refrigerant to a condensor and refrigerant leaving the condensor flowing to an evaporator, the evaporator outlet being connected to the compressor inlet by a suction line, in accordance with the present invention there is provided an electrically operated expansion valve for controlling the flow of refrigerant from the condensor to the evaporator, the expansion valve being balanced and providing at least a minimum refrigerant flow when in its fully closed position, means for sensing evaporator refrigerant conditions, and control means responsive to the sensed refrigerant conditions for modulating the valve.

DESCRIPTION OF THE DRAWINGS

The foregoing will be more readily apparent upon reading the following description in conjunction with drawings in which like elements in different figures thereof have the same reference character applied thereto and in which.

DETAILED DESCRIPTION

Figure 1:
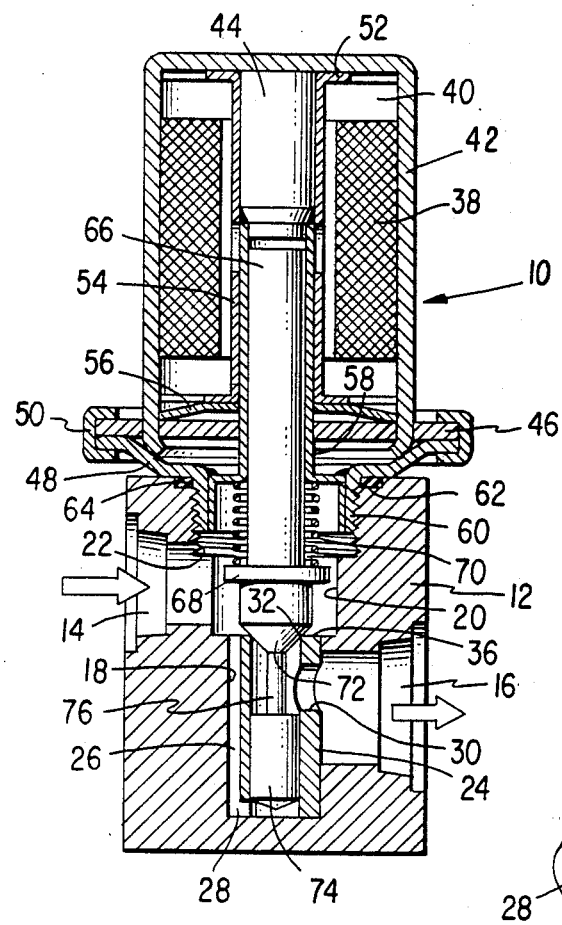
FIG. 1 is a longitudinal cross-sectional view of a first embodiment of an electrically operated expansion valve according to the present invention.

Referring to FIG. 1, the first embodiment of the valve, designated generally by the reference numeral 10, includes a valve body 12 formed with an inlet port 14 and an outlet port 16. The valve body 12 is also formed with an internal bore 18 intersecting the inlet port 14 and the outlet port 16, the upper end of the bore 18 being enlarged at 20 and further enlarged and threaded at 22. A sleeve 24 is press fit within the bore 18.

Figure 2:
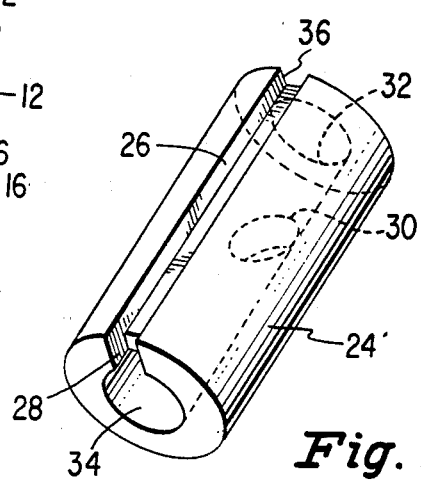
FIG. 2 is a perspective view of a sleeve incorporated in the valve of FIG. 1.

As shown in FIG. 2, the sleeve 24 includes an exterior channel 26 which extends longitudinally the entire length of the sleeve 24 and a transverse channel 28 which extends radially from the exterior channel 26 to the interior of the sleeve 24. The sleeve 24 is further formed with an opening 30 extending through the wall of the sleeve. The opening 30 is substantially opposite the exterior channel 26. The sharp corner 32 between the inside surface 34 and the flat end 36 of the sleeve 24 functions as a valve seat for the valve 10, as will be described hereinafter.

The operator for the valve 10 includes a solenoid coil 38 wound on a bobbin 40 which is surrounded by a magnetic yoke 42 with one open side. A pole piece 44 is attached to the yoke 42 and extends into the opening of the bobbin 40. A flux plate 46 has the yoke 42 staked thereto to complete the magnetic flux path. A metal stamping 48 is held against the flux plate 46 by a clamping ring 50. A pair of flux sleeves 52 and 54 extend into the opening of the bobbin 40 and a spring washer 56 holds the bobbin and flux sleeves in position. The flux plate 46 is formed with a central opening through which a non-magnetic plunger tube 58 extends. The plunger tube 58 is welded at the top to the pole piece 44 and at the bottom to the stamping 48. The stamping 48 is necked at 60 and formed with external threads thereat by which the solenoid assembly can be secured to the valve body 12. An annular recess 62 is provided in the valve body 12 surrounding the threaded portion 22 of the bore and an O-ring 64 in the annular recess 62 provides a seal when the solenoid assembly is secured to the valve body.

The operative member of the valve 10 is the plunger 66 which extends from the interior of the bobbin 40 into the internal bore 18 of the valve body 12. The plunger 66 is formed with a shoulder 68. A compression spring 70 surrounds the plunger 66 between the shoulder 68 and the plunger tube 58 and exerts a downward force on the plunger 66. The end of the plunger 66 which extends into the valve body 12 includes a tapered portion 72 which cooperates with the corner 32 of the sleeve 24 to control flow from the inlet port 14 to the outlet port 16. Thus, when the solenoid coil 38 is energized, the plunger 66 is moved upwardly until it contacts the pole piece 44, which acts as a limit stop for the plunger 66. Refrigerant may then flow from the inlet port 14, through the interior of the sleeve 24, through the opening 30 and to the outlet port 16. When the solenoid coil 38 is not energized, the spring 70 supplies sufficient force to move the plunger 66 downward until the tapered portion 72 rests against the valve seat formed by the sharp corner 32 of the sleeve 24. Since the pressure differential in an automotive air conditioning system can be at least 300 p.s.i., it would normally require a large amount of force to unseat the plunger 66 from the sleeve 24. In order to reduce the required force so as to reduce the necessary solenoid size, the valve 10 is pressure balanced. Accordingly, there is provided a piston 74 within the sleeve 24. The piston 74 includes a stem portion 76 which contacts the plunger 66. The channels 26 and 28, which lead to the underside of the piston 74, supply a balancing force to the plunger 66 since the pressure on the top of the plunger 66 is inlet pressure and due to the piston 76 contacting the underside of the plunger 66, the pressure beneath the piston 66 is effectively inlet pressure also.

The piston 74 is inserted within the sleeve 24 with a controlled fit so that there is provided a leakage path from the inlet 14, through the channels 26 and 28, through the clearance between the piston 74 and the sleeve 24, and through the opening 30 to the outlet port 16. This leakage path provides approximately 30% to 50% of the full flow of refrigerant and is desirable in order to reduce the "hammer" effect when opening and closing the valve and also allows for some flow of refrigerant whenever the compressor is running. Alternatively, other ways of providing the leakage path are by a nicked valve seat or a bypass hole.

Figure 3:
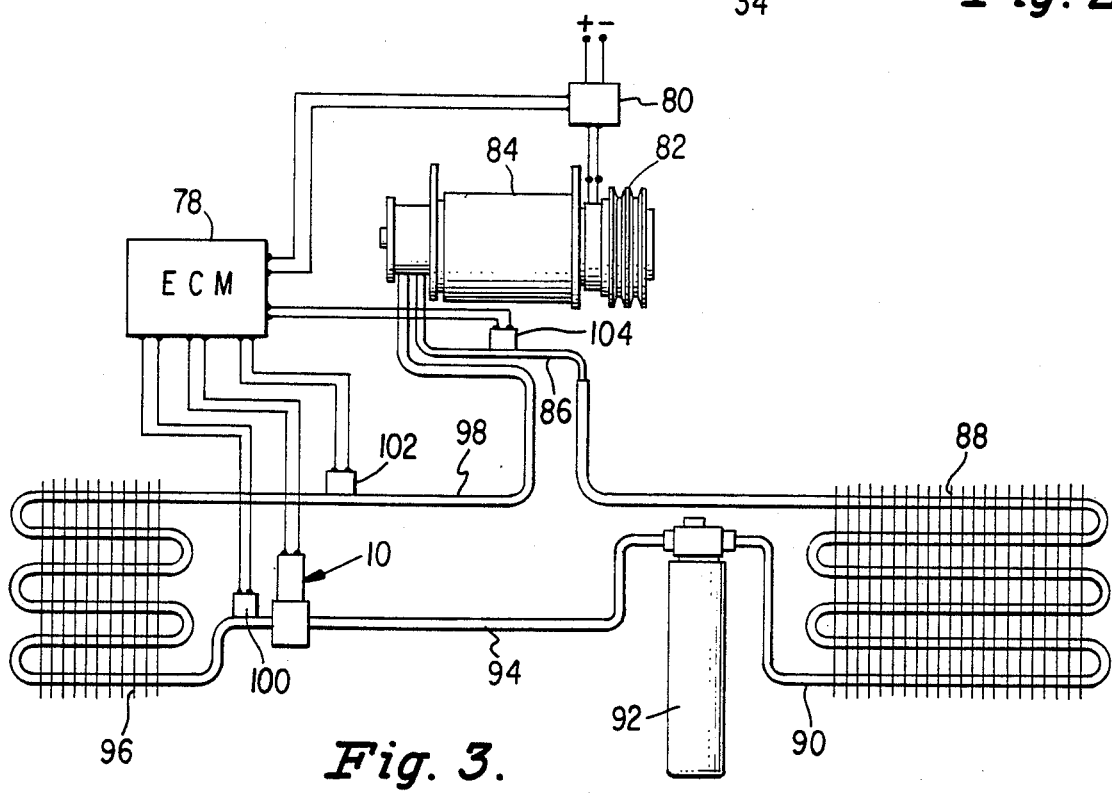
FIG. 3 is a schematic representation of an automotive air conditioning system using the valve of FIG. 1.

Referring now to FIG. 3, schematically illustrated therein is an automotive air conditioning system in which the valve 10 finds utility. This system is under the control of an electronic control module (ECM) 78 which may include an onboard microcomputer for the automobile. The ECM 78 controls a relay 80 to selectively energize the electrically operated clutch between the input 82 and the compressor 84. The input 82 is driven by V-belts from the engine (not shown). The compressor discharge line 86 leads to the condensor 88 which discharges through the conduit 90 leading to the dehydrator/receiver 92. Flow from the dehydrator/receiver 92 through the conduit 94 to the evaporator 96 is controlled by the valve 10. The suction line 98 connects the evaporator 96 to the inlet of the compressor 84. Various sensors are provided whereby the ECM 78 may monitor the state of the air conditioning system. Thus, there may be provided an evaporator inlet temperature sensor 100, an evaporator outlet temperature sensor 102 and a compressor discharge temperature sensor 104. Additionally, evaporator pressure sensors may be provided. The ECM 78 utilizes the sensed conditions to determine the appropriate flow rate of liquid refrigerant in the conduit 94 to the evaporator 96. Additionally, the ECM 78 could also respond to engine speed, vehicle speed, ambient temperature, etc. It is anticipated that control of the valve 10 is with a pulse width modulation format and the design of the valve, with its feature of pressure balancing, makes such pulse width modulation possible.

Additionally, the valve 10 can perform the function of a high pressure cutout switch to reduce flow in order to control excessive head pressure without stopping the compressor. This would eliminate undesirable "surge" and provide continuance of some degree of cooling in the high ambient idle in traffic condition which provides a high head pressure. Furthermore, the valve could also be shut off a few seconds before the compressor clutch cycles off to provide evacuation of the evaporator. This should reduce objectionable "surge" that is experienced sometimes with clutch cycling.

Figure 4:
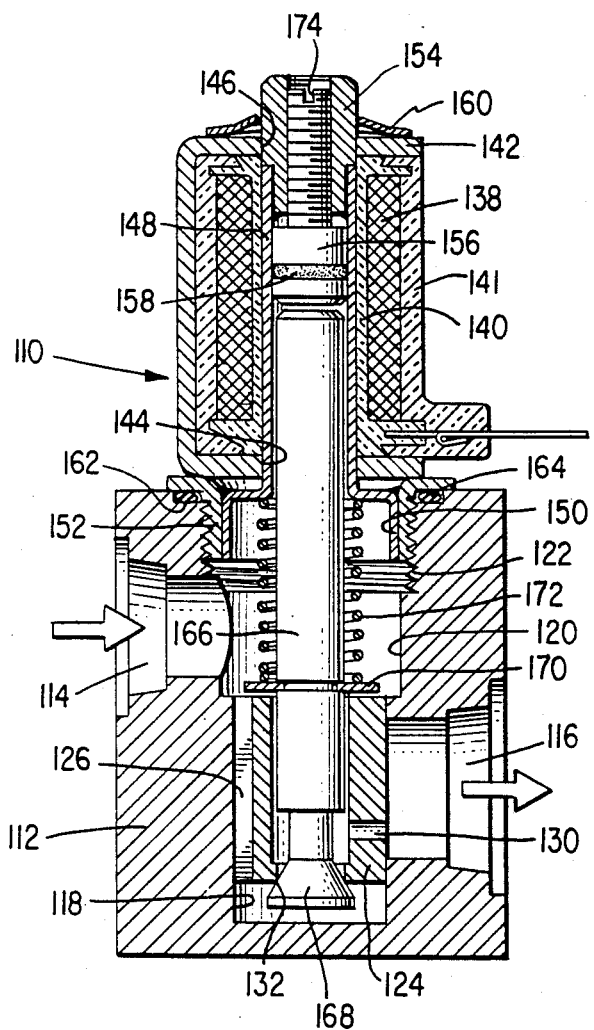
FIG. 4 is a longitudinal cross-sectional view of a second embodiment of an electrically operated expansion valve according to the present invention.

Referring to FIG. 4, the second embodiment of the valve, designated generally by the reference numeral 110, includes a valve body 112 formed with an inlet port 114 and an outlet port 116. The valve body 112 is also formed with an internal bore 118 intersecting the inlet port 114 and the outlet port 116, the upper end of the bore 118 being enlarged at 120 and further enlarged and threaded at 122. A sleeve 124 is press fit within the bore 118.

Figure 5:
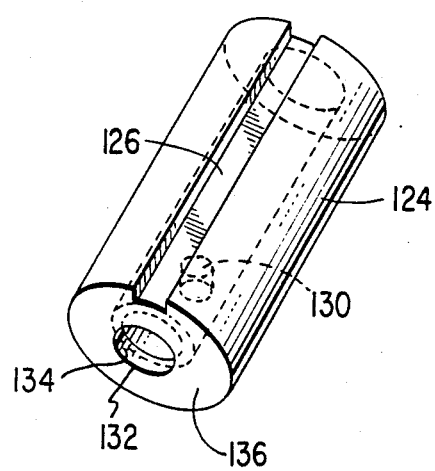
FIG. 5 is a perspective view of a sleeve incorporated in the valve of FIG. 4.

As shown in FIG. 5, the sleeve 124 includes an exterior channel 126 which extends longitudinally the entire legnth of the sleeve 124. The sleeve 124 is further formed with an opening 130, substantially opposite the exterior channel 126, and extending through the wall of the sleeve 124. The sharp corner 132 between the inside surface 134 and the flat end 136 of the sleeve 124 functions as a valve seat for the valve 110, as will be described hereinafter.

The operator for the valve 110 includes a solenoid coil 138 wound on a bobbin 140 which is then encapsulated in plastic 141 and surrounded by a magnetic yoke 142. The yoke 142 has a pair of opposed openings 144 and 146 axially aligned with the bobbin 140. A nonmagnetic plunger tube 148 extends into the bobbin 140. The plunger tube 148 is flared outwardly at 150 where it is welded to an externally threaded metal stamping 152. The other end of the plunger tube 148 is welded to an internally threaded pole cap 154 which extends outwardly from the yoke 142. A magnetic pole piece 156 is threaded into the pole cap 154. The pole piece 156 is formed with a circumferential groove for holding an O-ring 158 which seals the plunger tube 148. The plunger tube 148, the metal stamping 152, the pole cap 154, and the pole piece 156 are secured to the yoke 142 by means of a spring retainer clip 160 which fits over the outwardly extending end of the pole cap 154. The external threads on the stamping 152 are used to secure the solenoid assembly to the valve body 112. An annular recess 162 is provided in the valve body 112 surrounding the threaded portion 122 of the bore and an O-ring 164 in the annular recess 162 provides a seal when the solenoid assembly is secured to the valve body.

The operative member of the valve 110 is the plunger 166 which extends from the interior of the bobbin 140 into the internal bore 118 of the valve body 112. The plunger 166 extends through the sleeve 124 and is terminated by a conical portion 168 which acts as a valve member cooperating with the valve seat 132. The plunger 166 is formed with a circumferential groove into which an E-ring 170 is inserted. A compression spring 172 surrounds the plunger 166 between the E-ring 170 and the plunger tube 148 and exerts a downward force on the plunger 166 which biases the valve to its open condition. The valve stroke is limited by the E-ring 170 contacting the top of the sleeve 124. In this condition, refrigerant may flow from the inlet port 114, through the channel 126, through the clearance between the valve seat 132 and the valve member 168, through the opening 130 and to the outlet port 116. The opening 130 is sized to limit the maximum flow rate through the valve 110.

When the solenoid coil 138 is energized, the plunger 166 is moved upwardly until the valve member 168 contacts the valve seat 132. The pole piece 156 is formed with a slot 174 into which a screw driver may be inserted to adjust the distance that the pole piece 156 extends into the plunger tube. The purpose of this adjustment feature is to accommodate manufacturing tolerances in order to be certain that the valve member 168 completely closes off the valve seat 132 when the coil 138 is energized. The plunger 166 is inserted within the sleeve 124 with a controlled fit so that, like the first valve embodiment 10, there is provided a leakage path from the inlet 114, through the clearance between the plunger 166 and the sleeve 124, and through the opening 130 to the outlet port 116.

It is noted that when the valve 110 is open, the pressure is balanced across the valve member 168 so that the solenoid only has to be strong enough to overcome the forces of the spring 172. Also, when the valve 110 is closed, the pressure across the valve member 168 is likewise balanced so that a smaller spring 172 can be used, reducing the required solenoid size.

The second embodiment valve 110 can be used in the system shown in FIG. 3 in place of the first embodiment valve 10. However, it must be realized that the valve 10 is normally closed and the valve 110 is normally open so that the solenoid energization/deenergization time ratios must be reversed when changing from one valve to the other.

Accordingly, there has been disclosed an improved automotive air conditioning system utilizing an electrically operated expansion valve. It is understood that the above-described embodiments are merely illustrative of the application of the principles of this invention. Numerous other embodiments may be devised by those skilled in the art without departing from the spirit and scope of this invention, as defined by the appended claims.

We claim:

1. An electrically operated expansion valve for use in an automotive air conditioning system comprising:
   a valve body formed with an internal bore extending into said body from one end thereof, an inlet port generally transverse to and intersecting said bore, and an outlet port generally transverse to and intersecting said bore, said inlet and outlet ports being offset relative to each other along the major axis of said bore, with said inlet port being closer to said one end of said valve than said outlet port;
   a hollow sleeve member tightly fitted within said bore in the region of said outlet port, said sleeve member being formed with a valve seat on one end thereof and an opening through its wall to provide communication between the interior of said sleeve member and said outlet port, said sleeve member being further formed with an exterior channel extending the length of said sleeve member substantially opposite said opening;
   a solenoid mounted on said one end of said valve body, said solenoid having a movable plunger extending into said internal bore, the end of said plunger which extends into said internal bore being formed as a valve member to cooperate with said valve seat to control the flow through said inlet and outlet ports, energization of said solenoid causing said plunger to move outward from said valve body;
   spring means for yieldably biasing said plunger inward of said valve body;
   means for pressure balancing said valve; and
   means for providing at least a minimum flow through said inlet and outlet ports independent of the condition of said solenoid.

2. The valve according to claim 1 wherein said valve seat is on the end of said sleeve member closer to said solenoid, said spring means biasing said plunger toward said valve seat to diminish said flow.

3. The valve according to claim 2 wherein said balancing means includes a piston slidingly fitted within said sleeve member, said exterior channel, and a transverse channel extending from said exterior channel to the interior of said sleeve member at a point beyond said piston from said valve seat.

4. The valve according to claim 3 wherein said minimum flow providing means includes said exterior channel, said transverse channel, and the clearance between said piston and said sleeve member interior.

5. The valve according to claim 4 wherein said valve body is formed with a threaded bore axially aligned with said internal bore and said solenoid includes:
   a coil wound on a bobbin;
   a magnetic yoke member around said coil having an open end axially aligned with said bobbin;
   a magnetic pole piece attached to said yoke member and extending axially into said bobbin opposite said open end of said yoke member;
   a magnetic flux plate connected to said yoke member to cover said open end and having an opening through which said plunger extends;
   a threaded stamping adapted to be threaded into said valve body threaded bore; and
   means for securing said flux plate to said stamping.

6. The valve according to claim 1 wherein the end of said sleeve member further from said solenoid extends into said bore past said outlet port, said valve seat being formed on said further end, said plunger extends through said sleeve member, said spring means biases said plunger end away from said valve seat to increase said flow, and said minimum flow providing means includes the clearance between said plunger and said sleeve member interior.

7. The valve according to claim 6 wherein said balancing means includes said exterior channel and the clearance between said plunger and said sleeve member interior.

8. The valve according to claim 7 wherein said valve body is formed with a threaded bore axially aligned with said internal bore and said solenoid includes:
   a coil wound on a bobbin;
   a magnetic yoke member around said coil having a pair of opposed openings axially aligned with said bobbin;
   a non-magnetic plunger tube extending axially into said bobbin from one end thereof and surrounding that portion of said plunger extending outside said valve body;
   a threaded stamping secured to said plunger tube outside said bobbin and adapted to be threaded into said valve body threaded bore;
   a pole cap secured to said plunger tube inside said bobbin and extending outside the other end of said bobbin;
   a magnetic pole piece attached to said pole cap and extending into said plunger tube; and
   means for securing said yoke member to said stamping.

9. The valve according to claim 8 wherein said pole cap extends beyond said yoke member and said securing means includes a spring retainer clip surrounding said pole cap outside said yoke member.

10. The valve according to claim 8 wherein said pole cap is internally threaded and said pole piece is threadedly secured to said pole cap, whereby the distance said pole piece extends into said plunger tube is adjustable.

11. The valve according to claim 1 wherein said opening is sized to limit the maximum flow rate through said valve.

* * * * *